Figure 2:
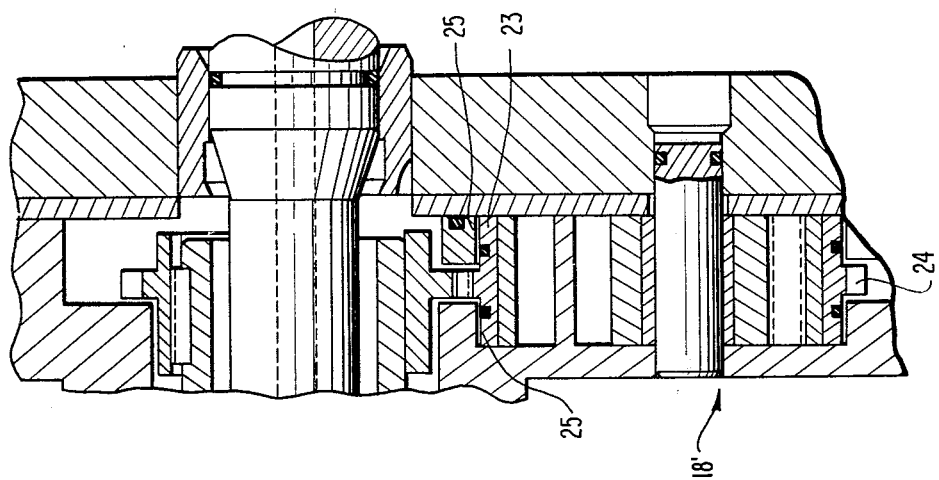

United States Patent [19]
Pickard

[11] 4,198,818
[45] Apr. 22, 1980

[54] PRIMARY PUMP DRIVE FOR AUTOMATIC MOTOR VEHICLE TRANSMISSIONS

[75] Inventor: Jürgen Pickard, Wernau, Fed. Rep. of Germany

[73] Assignee: Daimler-Benz Aktiengesellschaft, Fed. Rep. of Germany

[21] Appl. No.: 902,053

[22] Filed: May 2, 1978

[30] Foreign Application Priority Data

May 10, 1977 [DE] Fed. Rep. of Germany ....... 2720879

[51] Int. Cl.² ............................................ F16D 33/00
[52] U.S. Cl. ...................................... 60/330; 60/358; 60/364; 74/730
[58] Field of Search .................. 60/330, 341, 358, 361, 60/364, 366; 74/730

[56] References Cited

U.S. PATENT DOCUMENTS

| Re. 26,917 | 6/1970 | Dickenbrock | 74/730 |
| 2,671,359 | 3/1954 | Scheiter | 74/730 |
| 2,801,521 | 8/1957 | Jandasek | 60/361 |

*Primary Examiner*—Edgar W. Geoghegan
*Attorney, Agent, or Firm*—Craig and Antonelli

[57] ABSTRACT

A primary pump drive for automatic motor vehicle transmissions, in which the primary pump is adapted to be driven directly from the input and is arranged with its axis parallel to the input axis. The pump is constructed as an internally toothed pump and its internally toothed wheel is provided with teeth at the external circumference thereof, into which engage the teeth of a gear connected with the input.

8 Claims, 2 Drawing Figures

U.S. Patent
Apr. 22, 1980
4,198,818

PRIMARY PUMP DRIVE FOR AUTOMATIC MOTOR VEHICLE TRANSMISSIONS

The present invention relates to a primary pump drive for automatic motor vehicle transmissions, especially for those with a hydrodynamic and with a mechanical transmission part, whereby a primary pump is adapted to be driven directly from the input and is arranged with its axis parallel to the input axis.

Primary pumps of the aforementioned type are known as such in the prior art. For that purpose, as a rule, gear pumps with an internally toothed gear are used which are arranged about the input shaft and whose driven externally toothed inner gear wheel is traversed by the input shaft and by the hollow pin (stator shaft) supporting the guide wheel moment.

The future, more strict fuel consumption regulations require a further efficiency improvement of the automatic transmission. The primary pump necessary for the transmission functioning is a main loss source in particular at high driving velocities. Tests have indicated an interdependence between the pitch diameter of the driving gear wheel and the mechanical-hydraulic efficiency, i.e., pumps of radially small construction, have a considerably better overall efficiency with the same pressure and the same feed quantity. However, with the pump drives of the aforementioned type of the known torque-converter multi-speed transmissions the structural size is now fixed with a central or concentric arrangement by the diameter of the hollow pin supporting or bracing the guide wheel moment.

The present invention is now concerned with the task to provide a pump drive by means of which an efficiency improvement can be achieved. at the pump. At the same time, however, the transmission-structural space should not be increased, i.e., the transmission should not become longer or larger in diameter.

It is known that externally toothed gear pumps have a better efficiency and such gear pumps could, of course, be driven by way of a counter-shaft gearing, for example, as shown in the German Auslegeschrift 1,530,567. However, such a solution must be discounted herein, not only because of the larger space requirement but also by reason of the considerably larger noise development of these pumps.

As solution to the underlying problems, the present invention proposes that the pump is constructed as an internally toothed pump and its internally toothed gear wheel is provided at the outer circumference with teeth, into which engage the teeth of a gear connected with the input. The solution proposed by the present invention offers the following advantages.

1. The hollow gear drive enables the installation of the internally toothed gear pumps customarily utilized at present in automatic transmissions, i.e., of so-called half-moon or crescent-shaped pumps which may consist advantageously of sintered gears and which have a narrow construction and exhibit low noise levels. By virtue of such arrangement, an improved automatic transmission construction is obtained without lengthening or increasing the diameter of the transmission which, of course, would not be possible since the size of a transmission is governed by the space afforded by the tunnel in the vehicle floor beneath which the transmission is disposed.

2. The pump dimensions are now determined exclusively by the feed performance data, and no longer by system-conditioned factors such as, for example, the extension of the stator shaft through the pump driving gear. Therefore, the pump can be constructed optimally small and an efficiency gain of about 15% to 20% results therefrom.

3. The feed quantity, for example, for an increased cooling oil requirement in the torque converter can be changed corresponding to the engine output to be transmitted without change of the pump dimensions by way of the gearing ratio.

4. The externally disposed pump permits an optimum pressure and suction channel construction, i.e., short channels without deflection to the main housing and therewith to the oil sump, which produces a considerable power gain.

5. The additional driving gear can be maufactured inexpensively as a sintered part of the large series transmissions used in, for example, commercial vehicles or trucks or it may, if desired, the additional driving gear may serve at the same time as driving gear for motor-dependent auxiliary drives which are adapted to be driven from the motor vehicle transmission.

6. With the outwardly disposed pump having short suction and pressure channels, it is possible to construct the necessary threaded connection of pump housing and transmission cover with such a short thread distance that the required intermediate sheet metal member does not buckle during attachment of the pump, bulge out under oil pressure effective during operation of the transmission, nor touch or contact of the pump gears. Consequently, the axial clearances of the pump wheels can be reduced and an increase of the volumetric efficiency can be obtained.

Customarily, an automatic transmission includes a hydrodynamic unit whose input or driving housing includes, in a direction toward the mechanical transmission part, a hollow shaft for the pump drive, through which extends the output shaft of the hydrodynamic unit. In accordance with the present invention an end of the hollow shaft engages in a concentric gear or includes such gear teeth which serve to drive the pump gear wheel. Furthermore, it is also within the scope of the present invention, in special cases, to have the toothed end of the hollow shaft engage directly in the externally toothed rim at the hollow pump wheel. By virtue of such an arrangement, external teeth of the hollow pump wheel may be arranged unilaterally offset and a roller bearing for the hollow pump wheel may be arranged adjacent thereto. In the alternative, the external teeth of the hollow pump wheel may be located in a plane of symmetry thereof and a slide bearing for the hollow pump wheel may be arranged on both sides thereof.

Accordingly, it is an object of the present invention to provide a primary pump drive for automatic motor vehicle transmissions which avoids by simple means the aforementioned shortcomings and drawbacks encountered in the prior art.

Another object of the present invention resides in providing a primary pumpdrive for automatic motor vehicle transmissions which will help in fulfilling the needs of future, more strict fuel consumption regulations.

A further object of the present invention resides in providing a primary pump drive of the type described above, which not only assures an improved efficiency of the pump but at the same time avoids an increase in the structural space required for the transmission.

Still a further object of the present invention resides in providing a primary pump drive for automatic motor vehicle transmissions, which produces an improved efficiency yet precludes the need for an increase in either the length or diameter of the transmission.

Another object of the present invention resides in providing a primary pump drive for automatic motor vehicle transmissions which produces a relatively low noise level notwithstanding its high efficiency.

A further object of the present invention resides in providing a primary pump drive for automatic motor vehicle transmissions, in which the pump can be constructed optimally small so as to realize a high efficiency can be realized, and by which optimum pressure and suction channel construction without deflection is made possible.

Still a further object of the present invention resides in providing a primary pump drive of the type described above, in which at least some of the parts can be manufactured by simple methods.

Figure 1:
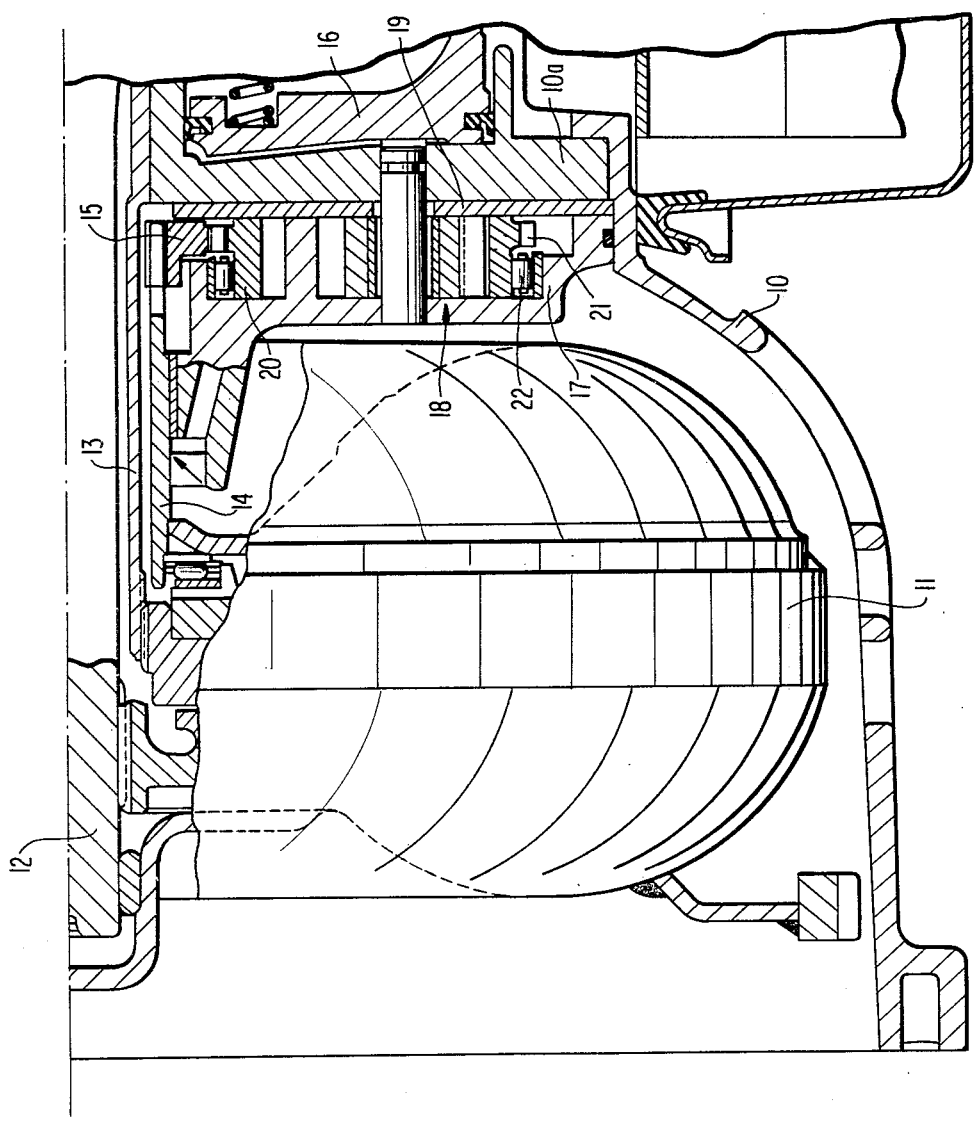

These and other objects, features and advantages of the present invention will become more apparent from the following description when taken in connection with the accompanying drawing which shows, for purposes of illustration only, two embodiments in accordance with the present invention and wherein:

FIG. 1 is partial cross-sectional view through one embodiment of a primary pump with a drive from a torque converter in accordance with the present invention; and FIG. 2 is a partial cross-sectional view through a modified embodiment of a primary pump drive in accordance with the present invention.

Referring now to the drawing and more particularly to FIG. 1, according to this figure, a hydrodynamic torque converter 11 driven from the flywheel of the driving engine in a manner not shown in detail so that its housing rotates constantly with the input is arranged in the transmission housing 10. The turbine of the torque converter 11 drives, by way of the shaft 12, a mechanical transmission part (not shown). The guide wheel of the torque converter 11 is fixedly supported at the housing of the torque converter by way of a hollow pin 13. The shaft 12 and the hollow pin 13 extend through a hollow shaft 14 which is connected with the housing of the torque converter 11 and which therefore rotates constantly at the speed of the input. This hollow shaft 14 engages with its end in a gear 15, which is constructed as hollow gear and which concentrically surrounds the hollow shaft 14, the hollow pin 13 and the shaft 12.

A housing part 10a is inserted into the transmission housing 10, which serves, on the one hand, for the formation of an actuating cylinder for an actuating piston 16 of a shifting clutch (not shown) or shifting brake (not shown) and which, on the other hand, receives the primary pump generally designated by reference numeral 18 of the transmission in a cover 17. An intermediate sheet-metal member 19 which covers off the channel lay-out for the pump in the housing part 10a is disposed between the pump 18 and the housing part 10a.

The pump 18 is constructed as an internally toothed pump; however, it is now located adjacent the drive or input shaft 12, so to speak, and no longer, as heretofore, concentrically disposed with respect to the input shaft 12. Consequently, the pump 18 can be constructed very small and as a result thereof, it possesses a high efficiency. The internally toothed hollow gear wheel 20 of the pump 18 is provided with external teeth of an externally toothed rim 21 which are unilaterally offset toward the intermediate sheet metal plate 19. A roller bearing 22 for the bearing support of the internally toothed hollow wheel 20 is disposed adjacent thereto in the cover 17. The gear 15 on the hollow shaft 14 engages with the externally toothed rim 21 so that in this manner the pump 18 rotates continuously with the input. As a result of the outwardly disposed arrangement of the pump 18, which can be optimally designed for only feed performance, and as a result of the described drive by way of the toothed hollow wheel 20, a very narrow and small type of construction is obtained. The toothed hollow wheel 20 can be constructed as a sintered part thereby eliminating the need for special material-removing machining in the manufacturing thereof.

According to FIG. 2, the pump generally designated by the reference numeral 18′ is arranged and constructed, in principle, in the same manner as the pump 18 with the drive also taking place, in principle, exactly as the embodiment according to FIG. 1. However, the external teeth 24 are now arranged at the internally toothed hollow pump wheel 23 in the plane of symmetry. A slide bearing 25 for the internally toothed pump hollow wheel 23 is now provided on both sides of the external teeth 24. A better force distribution and a bearing support of the hollow pump wheel 23 results in this manner than with the concentrically arranged half-moon or crescent shaped pumps. As to the rest, the pump 18′ operates in the same manner as the pump 18 of according to FIG. 1 and the same advantages are attainable therewith.

While I have shown and described only two embodiments in accordance with the present invention, it is understood that the same is not limited thereto but is susceptible of numerous changes and modifications as known to those skilled in the art, and I do not wish to be limited to the details shown and described herein but intend to cover all such changes and modifications as are encompassed by the scope of the appended claims.

I claim:

1. A primary pump drive for automatic transmissions, the primary pump drive comprising primary pump means operable to be driven directly from an input means, the primary pump means being arranged with the axis of rotation thereof extending substantially parallel to an input axis of the input means, characterized in that the primary pump means is constructed as an internally toothed pump and includes an internally toothed pump wheel provided at an outer circumference thereof with external teeth, and in that the external teeth are adapted to engage with teeth of a gear connected with the input means.

2. A primary pump drive according to claim 1, characterized in that the automatic transmission includes a hydrodynamic transmission part and a mechanical transmission part.

3. A primary pump drive according to claim 1, with a hydrodynamic unit having a housing operatively connected with the input means for rotation therewith, a hollow shaft means operatively connected to the housing and extending therefrom in a direction toward a mechanical transmission part, the hollow shaft means forming a portion of a drive means for the primary pump means, the hydrodynamic unit further including an output shaft means extending through said hollow shaft means, characterized in that an end of the hollow shaft means engages into a substantially concentric drive gear means forming a drive member for the internally toothed pump wheel.

4. A primary pump drive according to claim 1, with a hydrodynamic unit having a housing operatively connected with the input means for rotation therewith, a hollow shaft means operatively connected to the housing and extending therefrom in a direction toward a mechanical transmission part, the hollow shaft means forming a portion of a drive means for the primary pump means, the hydrodynamic unit further including an output shaft extending through said hollow shaft means, characterized in that an end of the hollow shaft means is provided with concentric teeth means for driving of the internally toothed pump wheel.

5. A primary pump drive according to claim 1, characterized in that the external teeth of the internally toothed pump wheel are unilaterally offset and a roller bearing means for the internally toothed pump wheel is arranged adjacent the roller bearing means.

6. A primary pump drive according to claim 1, characterized in that the external teeth of the internally toothed pump wheel are located in a plane of symmetry thereof, and a slide bearing means for the internally toothed pump wheel is arranged on both sides of the external teeth.

7. A primary pump drive according to claim 5 or 6, with a hydrodynamic unit having a housing operatively connected with the input means for rotation therewith, a hollow shaft means operatively connected to the housing and extending therefrom in a direction toward a mechanical transmission part, the hollow shaft means forming a portion of a drive means for the primary pump means, the hydrodynamic unit further including an output shaft means extending through said hollow shaft means, characterized in that an end of the hollow shaft means engages into a substantially concentric drive gear means forming a drive member for the internally toothed pump wheel.

8. A primary pump drive according to claim 5 or 6, with a hydrodynamic unit having a housing operatively connected with the input means for rotation therewith, a hollow shaft means operatively connected to the housing and extending therefrom in a direction toward a mechanical transmission part, the hollow shaft means forming a portion of a drive means for the primary pump means, the hydrodynamic unit further including an output shaft extending through said hollow shaft means, characterized in that an end of the hollow shaft means is provided with concentric teeth means for driving of the internally toothed pump wheel.

* * * * *